United States Patent Office 2,919,279
Patented Dec. 29, 1959

2,919,279

N-VINYL-X-ALKYL-2-OXAZOLIDINONE COMPOUNDS

Wilhelm E. Walles, William F. Tousignant, and Thomas Houtman, Jr., Midland, Mich., assignors to The Dow Chemical Company, Midland, Mich., a corporation of Delaware No Drawing. Application November 14, 1957
Serial No. 696,317

3 Claims. (Cl. 260—307)

The present invention resides in the general field of organic chemistry. It has reference to certain alkyl ring substituted homologues of N-vinyl-2-oxazolidinone or N-vinyl-X-alkyl-2-oxazolidinone compounds, which are new and useful monoethylenically unsaturated monomeric substances, and to various derivatives thereof, particularly polymeric and resinous products that have great utility and provide for many benefits and advantages in numerous applications. The invention is also concerned with the preparation of the indicated N-vinyl-X-alkyl-2-oxazolidinone compounds.

One basic object of the invention is to provide, as new compositions of matter, N-vinyl-X-alkyl-2-oxazolidinone compounds that contain the characterizing group:

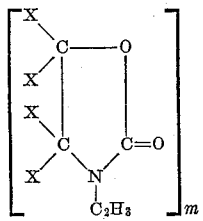

wherein each X is independently selected from the group consisting of hydrogen and alkyl radicals containing from 1 to about 4 carbon atoms, particularly methyl and ethyl radicals, with the limitation that not more than 3 of said substituent members can be hydrogen, and wherein $m$ has a numerical value of at least 1.

A particular object is to provide monomeric N-vinyl-X-alkyl-2-oxazolidinone compounds of the indicated varieties and having the indicated alkyl ring substituents on other than the heterocyclic nitrogen atom in the 2-oxazolidinone nucleous.

A specific object is to provide monomeric N-vinyl-5-methyl-2-oxazolidinone having the precise structure:

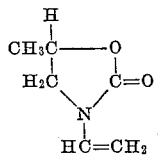

Another specific object is to provide monomeric N-vinyl-5-ethyl-2-oxazolidinone having the precise structure:

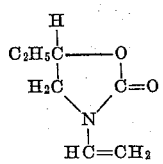

A related object is to provide an advantageous method for the manufacture of monomeric N-vinyl-X-alkyl-2-oxazolidinone compounds of the indicated varieties, particularly monomeric N-vinyl-5-methyl-2 - oxazolidinone; N-vinyl-4-methyl-2-oxazolidinone; N-vinyl-5-ethyl-2-oxazolidinone; and N-vinyl-4-ethyl-2-oxazolidinone and other of their ring substituted homologues.

A further object, and one that is of considerable importance, is to provide polymeric products, particularly homopolymers, that are derived from ring substituted N-vinyl-X-alkyl-2-oxazolidinone monomers of the indicated varieties, especially those derived from N-vinyl-5-methyl-2-oxazolidinone and N-vinyl-5-ethyl-2-oxazolidinone.

As associated object of the invention is to provide methods for the preparation of polymeric N-vinyl-X-alkyl-2-oxazolidinone compounds of the indicated varieties According to the present invention, the new monomeric compounds which possibilitate the achievement of the above indicated and cognate objects (including the formation of new polymeric products) is of the general structure:

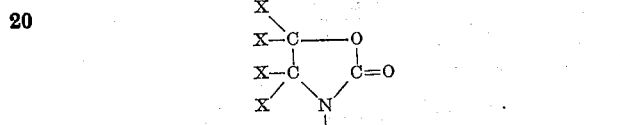

wherein each X has the above-indicated values and at least one of them is an alkyl ring substitutent. The monomeric N-vinyl-X-alkyl-2-oxazolidinone compounds are oridinarily clear, colorless liquids at, or at least near, normal room temperatures which often are insoluble in water, but generally are soluble in lower aliphatic alcohols, such as methanol and ethanol, and many other organic solvents. As employed herein, the symbol "X" is intended to indicate at least a single ring substitutent on at least a single position, randomly identified, on the cyclic, substituted nucleus.

For example, N-vinyl-5-methyl-2-oxazolidinone is a clear, colorless liquid at room temperature which is soluble in water while being soluble in certain aqueous saline media, such as dilute solutions of sodium chloride in water. The monomeric N-vinyl-5-methyl-2-oxazolidinone is soluble in methanol and other aliphatic low molecular weight alcohols as well as in other organic solvents, including styrene, dioxane, diethyl ether, dimethyl formamide, the dimethyl ethers of di-, tri-, or tetraethyl glycol and the like. N-vinyl-5-methyl-2-oxazolidinone is generally insoluble, however, in such aliphatic liquids as cyclohexane, octane and the like and in petroleum ether. In the range of absolute pressure from about 1 to 2 mm. of mercury, N-vinyl-5-methyl-2-oxazolidinone boils at temperatures between about 85 and 95° C. Thus, under an absolute pressure of about 1.4 mm. of mercury, the boiling point of monomeric N-vinyl-5-methyl-2-oxazolidinone is about 86–92° C. Monomeric N-vinyl-5-methyl-2-oxazolidinone has a refractive index, taken at 25° C., of about 1.4752 and a specific gravity, taken at 20° C. and corrected to 4° C., of about 1.085 grams per cubic centimeter. Monomeric N-vinyl-4-methyl-2-oxazolidinone and monomeric N-vinyl-4,5-dimethyl-2-oxazolidinone have similar physical properties.

N-vinyl-5-ethyl-2-oxazolidinone is also a clear, colorless liquid which is soluble in many of the same solvents as N-vinyl-5-methyl-2-oxazolidinone and generally insoluble in water. Monomeric N-vinyl-5-ethyl-2-oxazolidinone boils at temperatures between about 80 and 95° C. in the range of absolute pressure from about 0.5 to 1 mm. of mercury. Under an absolute pressure of about 0.7 mm. of mercury, the boiling point of the monomeric N-vinyl-5-ethyl-2-oxazolidinone is about 82–90° C. The monomeric N-vinyl-5-ethyl-2-oxazolidinone has a refractive index, taken at 25° C., of about 1.4764 and a specific gravity, taken at 20° C. and corrected to 4° C., of about 1.074 grams per cubic centimeter. Monomeric N-vinyl-4-ethyl-2-oxazolidinone and monomeric N-vinyl-4,5-diethyl-2-oxazolidinone have properties that are generally analogous to those of N-vinyl-5-ethyl-2-oxazolidinone.

For purpose of specific comparsions, the solubilities of monomeric N-vinyl-5-methyl-2-oxazolidinone (VO–M) and N-vinyl-5-ethyl-2-oxazolidinone (VO–E), as well as those of monomeric, unsubstituted N-vinyl-2-oxazolidinone (VO), are set forth in the following tabulation. Each of the general solubility tests were performed by adding about 1 drop of the monomer being tested to about 3 milliliters of the solvent. In the table, the symbol "S" indicates solubility and "I" designates insolubility.

TABLE I

*General solubilities of various N-vinyl-2-oxazolidinone monomers in various solvents*

| Solvent | VO | VO-M | VO-E |
| --- | --- | --- | --- |
| Skelly Solvent at 60–70° C | I | I | I |
| Skelly Solvent at 100–140° C | I | I | I |
| Skelly Solvent at 150–205° C | I | S | S |
| Benzene | S | S | S |
| Cyclohexane | I | I | S |
| o-Dichlorobenzene | S | S | S |
| Styrene | S | S | S |
| Dimethyl formamide | S | S | S |
| Chloroform | S | S | S |
| Ethanol-Benzene Mixture (a) | S | S | S |
| N-Amyl Alcohol | S | S | S |
| 2-Ethyl hexanol | S | S | S |
| Dioxane | S | S | S |
| Diethyl ether | S | S | S |
| Tetraethyleneglycol dimethyl ether | S | S | S |
| Water | S | S | I |

Note (a): Known as "Ethanol 2B," a denatured alcohol formulation containing 0.5 gallon of benzene per 100 gallons of 190 proof ethanol.

Upon infrared analysis, all of the monomeric N-vinyl-X-alkyl-2-oxazolidinone compounds of the present invention exhibit the characteristic absorption bands that are obtained when N-vinyl groups and

structural formations are present.

The monomeric N-vinyl-X-alkyl-2-oxazolidinone compounds of the present invention are relatively unstable upon exposure to light, particularly sunlight. Generally, the unstabilized monomers become discolored to a very light shade of yellow within several days of continued exposure to light. However, when they are kept in the dark, particularly when they are maintained under an atmosphere of nitrogen, their natural stability is usually good. Thus, the monomeric N-vinyl-X-alkyl-2-oxazolidinone compounds may be stored safely for prolonged periods when maintained so as to be protected in the indicated manner. The monomeric compounds react with solutions of bromine in chloroform, as evidenced by rapid discoloration of the halogen solution, due to the bromination of the vinyl group in the monomers. Dilute solutions of potassium permanganate and the like reagents rapidly oxidize the vinyl group of monomeric N-vinyl-X-alkyl-2-oxazolidinone compounds.

The monomeric N-vinyl-X-alkyl-2-oxazolidinone compounds of the indicated varieties may advantageously be prepared by a method in accordance with the practice of the present invention which involves the transvinylation of alkyl-substituted 2-oxazolidinones with an alkyl vinyl ether under the influence of certain catalysts such as mercuric acetate (HgAc₂). The alkyl (including cycloalkyl) vinyl ether that is employed may contain from 1 to about 10 carbon atoms or so in the alkyl radical. Ethyl vinyl ether, n-butyl vinyl ether, ethyl cyclohexyl vinyl ether and the like are typical of the alkyl vinyl ethers that may suitably be employed. A transvinylation according to the invention with 5-methyl-2-oxazolidinone and n-butyl vinyl ether is represented by the following equation:

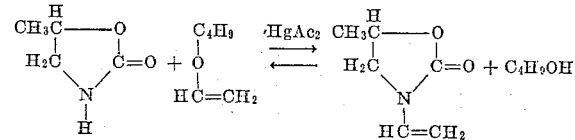

Some acetal by-products are also usually obtained in the reaction. Other catalysts, including mercuric benzoate, zinc acetate and phenyl mercuric acetate may be employed in place of or in combination with the mercuric acetate. Generally, an amount of the catalyst up to about 5 or 10 percent by weight, based on the weight of the reactant, may be required for the accomplishment of the transvinylation. Frequently, only 1 percent or less of the catalyst may be found to be required. Usually relatively greater quantities of the catalyst are necessary to employ when the reaction is performed by batch-wise techniques instead of according to continuous processing arrangements.

It is desirable for the reaction to be conducted in a solvent vehicle that is free from substituent hydroxy groups (such as dioxane, dimethyl formamide and the above-mentioned ethers of ethylene glycols and the like) and for the reaction mass to be maintained under an atmosphere of an inert gas, such as nitrogen, during the course of reaction, although the latter technique is not an absolute requirement. The reaction may be performed with benefit at temperatures from about 110 to 170° C. or so. Better results may often be obtained when the temperature of reaction is maintained between about 140 and 160° C. The reaction will occur at any desired pressure although, when it is conducted in autoclaves and the like apparatus, especially when solvent vehicles are employed, it is most convenient to accomplish the reaction under autogenous pressures. Ordinarily, good conversions and yields of desired product from the converted starting materials can be realized according to the method of the invention within reaction periods of 24 hours or less. By way of illustration, conversions in the neighborhood of 40–50 percent and greater and yields of from 80–90 percent and higher are not unusual. The desired monomeric N-vinyl-X-alkyl-2-oxazolidinone product can be recovered easily from the reaction mass using fractional distillation techniques.

N-vinyl-X-alkyl-2-oxazolidinone monomers will undergo polymerization in mass (which is oftentimes referred to as bulk polymerization) as well as polymerization, at practically any level of concentration, in aqueous or other solution or in emulsion or other dispersion in liquids with which the particular monomer or monomers being polymerized is or are not at all soluble or only partially soluble. It is ordinary beneficial for the polymerization to be conducted at a temperature between about 50 and 100° C., although this may vary with the particular catalysts used and type of reaction being conducted. Suitable catalysts or initiators for polymerization of the monomeric N-vinyl-X-alkyl-2-oxalzolidinone compounds include the azo catalysts, such as azobisisobutyronitrile, peroxygen catalysts, such as potassium persulfate, and irradiation under the influence of high energy fields. The latter catalyzation may include the various actinic radiations, including such diverse forms of catalysts as ultraviolet, X-ray and gamma radiations, as well as radiations from radioactive materials and high energy electron beams generated from linear accelerators, resonant transformers and the like. Frequently, the monomers will also undergo thermal polymerization without using catalyzing agents by simply heating them in air at a temperature of 100° C. or so. If desired, thermal mass polymerization may also be done under blanket of an inert gas, such as nitrogen. Copolymers of various N-vinyl-X-alkyl-2-oxazolidinone monomers with one another and with ring unsubstituted N-vinyl-2-oxazolidinone, as well as with other monomeric substances, including such monoethylenically unsaturated monomers as styrene, vinyl toluene, acrylonitrile, vinyl chloride, vinylidene chloride, methyl acrylate, ethyl acrylate, methyl methacrylate and other monomeric acrylate and methacrylate compounds, vinyl acetate, vinyl propionate and the like ethenoids may be prepared in ways analogous to those described in the foregoing, including suspension and emulsion polymerization techniques.

Poly-N-vinyl-X-alkyl-2-oxazolidinone, such as poly-N-vinyl-5-methyl-2-oxazolidinone and poly-N-vinyl-5-ethyl-2-oxazolidinone, may advantageously be prepared as high polymers having molecular weights, for example, in the range from 10 to 50 thousand and higher (as determinable from Fikentscher K-values of about 10 or more to as high as 75 to 100 or so) and a structural arrangement that may be depicted in the following way:

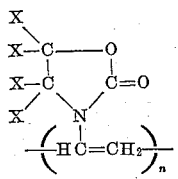

wherein each X has the above-indicated values, with at least one of the substituents being an alkyl group, and $n$ is a plural integer, preferably one whose numerical value is greater than 50 and which may be as large as 1,000 or more. Of course, lower molecular weight polymers can also be made. Surprisingly enough, in view of the character of unsubstituted poly-N-vinyl-2-oxazolidinone, most of the poly-N-vinyl-X-alkyl-2-oxazolidinone species are not hygroscopic. They usually are white or light colored, free-flowing powders that generally have non-crystalline natures as indicated by X-ray analysis. They generally fuse at elevated temperatures (usually in excess of 150 to 160° C.) and remain in a molten condition until heated to their temperature of decomposition. When the polymers are burned, they ordinarily leave a sponge-like residue which tends to indicate the evolution of carbon dioxide during thermal decomposition or combustion. As might be expected, the densities, softening points, fusing and melting temperatures and gas evolution points of the individual poly-N-vinyl-X-alkyl-2-oxazolidinones are found to vary with particular species of the polymers. This is illustrated in the following Table 2, wherein the indicated characteristics of poly - N - vinyl - 5 - methyl - 2 - oxazolidinone (PVO-M), having a Fikentscher K-value of about 20, and poly-N-vinyl-5-ethyl-2-oxazolidinone (PVO-E), having a Fikentscher K-value of about 16 are set forth. For purposes of comparison, the same characteristics of unsubstituted poly-N-vinyl-2-oxazolidinone (PVO), having a Fikentscher K-value of about 21 are also set forth as are the characteristics of poly-N-vinyl-2-pyrrolidone (PVP), having a Fikentscher K-value of about 38. PVP is a water-soluble resinous product of diverse origin which is well known to the art.

TABLE II

*Various characteristics of PVO–M and PVO–E compared with PVO and PVP*

| Characteristic | Polymer | | | |
|---|---|---|---|---|
| | PVP | PVO | PVO-M | PVO-E |
| Softening point, ° C | | 160 | 217 | 173 |
| Fusing temperature, ° C | 210 | 205 | 224 | 173 |
| Melting temperature, ° C | 224 | 235 | 227 | 178 |
| Gas evolution point, ° C | None up to 274 | 270 | 253 | 310 |
| Theoretical Density, grams per cubic centimeter | 1.23 | 1.45 | 1.35 | 1.28 |
| Observed Density, grams per cubic centimeter | 1.212 | 1.33 | 1.285 | 1.188 |
| Difference Between Calculated and Observed Density, grams per cubic centimeter | ca. 0.02 | ca. 0.11 | ca. 0.07 | ca. 0.09 |

Infra-red analyses of the various N-vinyl-X-alkyl-2-oxazolidinone polymers, such as poly-N-vinyl-5-methyl-2-oxazolidinone and poly-N-vinyl-5-ethyl-2-oxazolidinone, produce spectra conforming to an expectable pattern.

The poly-N-vinyl-X-alkyl-2-oxazolidinones can generally be molded at temperatures between about 100 and 150° C. to produce, clear, hard and brittle glass-like structures. The several N-vinyl-X-alkyl-2-oxazolidinone polymers exhibit divergent solubility characteristics in various solvents which, surprisingly, are quite distinct and ordinarily dissimilar from the solubility characteristics of poly-N-vinyl-2-oxazolidinone. Thus, despite the fact that poly-N-vinyl-2-oxazolidinone having a molecular weight in excess of about 10,000 is not soluble in water in concentrations of less than about 20 percent by weight, tending instead to form turbid dispersions and to oil out from the aqueous mixture, poly-N-vinyl-5-methyl-2-oxazolidinone over a much greater range of molecular weight up to about 100,000 or so is quite soluble in water at normal room temperatures. Likewise, while poly-N-vinyl-2-oxazolidinone is soluble in 10 percent aqueous solutions of sodium chloride, but insoluble in methanol, poly-N-vinyl-5-methyl-2-oxazolidinone is insoluble in the dilute aqueous salt solution while being readily soluble in the alcohol. Poly-N-vinyl-5-ethyl-2-oxazolidinone is generally insoluble in aqueous media while being soluble in most organic solvents. The solubilities of poly-N-vinyl-5-methyl-2-oxazolidinone and poly-N-vinyl-5-ethyl-2-oxazolidinone in several solvent media are set forth in the following Table III in comparison with the solubility of poly-N-vinyl-2-oxazolidinone in the same solvents. It should be borne in mind, incidentally, that the solubility characteristics of any given polymer may tend to vary under specific conditions with its Fikentscher K-value.

TABLE III

*Solubilities at room temperature and different concentrations of PVO–M and PVO–E in various solvents as compared with PVO*

| Solubility test with— | PVO (K-17.5) | PVO-M (K-21) | PVO-E (K-48) |
|---|---|---|---|
| 10 percent polymer in water | Insoluble | Soluble | Insoluble. |
| 20 percent polymer in water | Soluble | do | Do. |
| 10 percent polymer in 0.5 percent NaCl | do | do | Do. |
| 10 percent polymer in 10 percent NaCl | Insoluble | do | Soluble. |
| 10 percent polymer in methanol | do | do | Do. |
| 10 percent polymer in dioxane | do | Insoluble | Do. |
| Dichloromethane | do | Soluble to 33 percent clear liquid. | Soluble to 33 percent clear liquid; at 50 percent still soluble to form clear paste. |
| Acetone | do | Insoluble | Do. |
| Ethanol-Benzene Mixture | do | Partly soluble | Soluble to 25 percent clear liquid; at 33 percent soluble to form clear paste. |

Because of their excellent affinity for many of a wide variety of dyestuffs, the poly-X-N-vinyl-alkyl-2-oxazolidinones can ordinarily be employed with great benefit as dye-assisting adjuvants or dye-receptors for synthetic textile fibers and other shaped articles of normally difficult-to-dye synthetic polymers in which the poly-N-vinyl-X-alkyl-2-oxazolidinones may be incorporated. In this capacity, they may be utilized with exceptional advantage in connection with fiber-forming compositions and filamentary shaped articles produced therefrom of the various acrylonitrile polymers, particularly polyacrylonitrile. Besides such desirable utility, certain of the poly-N-vinyl-X-alkyl 2-oxazolidinones exhibit additional utilities of unusual attractiveness. For example, poly-N-vinyl-5-ethyl-2-oxazolidinones may be advantageously employed in wave or curl setting formulations or compositions for human hair.

The invention is further illustrated in and by the following examples wherein, unless otherwise indicated, all parts and percentages are to be taken by weight.

EXAMPLE 1.—PREPARATION OF N-VINYL-5-METHYL-2-OXAZOLIDINONE

About 101 grams (1 mole) of 5-methyl-2-oxazolidinone was dissolved in 200 grams of dry dioxane. To this solution there was added about 6 grams of mercuric acetate and 3 grams of benzoic acid. The mixture was then placed in an autoclave of the rocking variety having a capacity of about 1.5 liters and blanketed therein with an atmosphere of nitrogen. About 200 grams (2.0 moles) of n-butyl-vinyl ether was then added to complete the charge in the autoclave. The charged ingredients were then heated to a temperature of about 165° C. and synthermally maintained thereat for a period of about 24 hours, after which period the reaction was terminated. The reaction mass was then removed from the autoclave and subjected to fractional distillation. Under mildly reduced pressure (200 mm. Hg) at temperatures up to about 130° C., substantially all of the lower boiling constituents, including dioxane, unreacted n-butyl vinyl ether and n-butanol were stripped from the reaction mass. The remaining residue, which was a liquid having a black color, was then subjected to further fractional distillation under an absolute pressure of about 1.3 mm. of mercury at 86–92° C. About 50 grams of the desired monomeric N-vinyl-5-methyl-2-oxazolidinone was recovered. The yield of monomer, based on converted 5-methyl-2-oxazolidinone, was about 40 percent. The physical properties and characteristics of the monomeric N-vinyl-5-methyl-2-oxazolidnine were found to be as described in the foregoing specification.

EXAMPLE 2.—PREPARATION OF N-VINYL-5-METHYL-2-OXAZOLIDINONE

A charge comprised of about 202 grams (2 moles) of 5-methyl-2-oxazolidinone; 288 grams (4 moles) of ethyl vinyl ether; 200 grams of dry diozane and 12 grams (0.036 moles) of phenyl mercuric acetate was placed in a 1.5 liter rocking autoclave and heated to 155° C. at which temperature it was maintained for 24 hours. The autoclave was then permitted, over a 12 hour period, to cool to room temperature. The reaction product was then distilled under a vacuum following the general procedure of the first example. About 110 grams of monomeric N-vinyl-5-methyl-2-oxazolidinone and 110 grams of unreacted 5-methyl-2-oxazolidinone were recovered. This represented a 45 percent conversion of the 5-methyl-2-oxazolidinone and a 95 percent yield of the monomeric N-vinyl-5-methyl-2-oxazolidinone, based on converted 5-methyl-2-oxazolidinone.

When the foregoing procedure was repeated, excepting to conduct the reaction at higher temperatures of about 170° C., a somewhat lower yield of monomeric product was obtained. At reaction temperatures beneath the indicated range, very little, if any, of the desired monomer could be prepared.

EXAMPLE 3.—PREPARATION OF N-VINYL-5-ETHYL-2-OXAZOLIDINONE

The general procedure of the first example was essentially repeated, excepting to employ a reaction mixture of about 23 grams (2 moles) of 5-ethyl-2-oxazolidinone dissolved in about 300 grams of dioxane; and to use about 12 grams of mercuric acetate and 5 grams of benzoic acid as the catalyst; and to employ about 400 grams (4 moles) of n-butyl vinyl ether for the transvinylation. The transvinylation reaction was conducted at a temperature of about 155° C. About 130 grams (46 percent yield) of N-vinyl-5-ethyl-2-oxazolidinone product was recovered having physical properties and characteristics as described in the foregoing specification.

EXAMPLE 4.—SOLUTION POLYMERIZATION OF N-VINYL-5-METHYL-2-OXAZOLIDINONE

About 50 grams of monomeric N-vinyl-5-methyl-2-oxazolidinone, obtained as described in Example 1, were dissolved in about 150 grams of dry dioxane and placed in a polymerization vessel that was equipped with a nitrogen sparger and a water heating mantel. The polymerization mass was placed under a blanket of nitrogen after which about 0.5 grams of α,α'-azo-bisisobutyronitrile was added. The catalyst was observed to dissolve in the solution of the monomer. The polymerization mass was heated slowly until a temperature of about 65° C. was obtained. At this temperature polymerization was observed to commence. The polymerization was substantially completed within a period of about 2 hours during which time the polymerization mass was maintained at about 80° C. The polymeric product formed as a precipitate. Diethyl ether was then added to the polymerization mass and, upon filtration, about 50 grams of crude poly-N-vinyl-5-methyl-2-oxazolidinone was obtained. The polymeric product was purified by reprecipitation from methanolic solution which was added, via stillicidium, to an excess of ether. The purified polymer precipitated in the ether and was obtained as a fine powder. Subsequent filtration and drying yielded the substantially pure polymer product.

The solid poly-N-vinyl-5-methyl-2-oxazolidinone product had a white color. Its Fikentscher K-value was found to be about 20.2, indicating that the polymeric product had a molecular weight in the range of about 10,000. The polymer was readily soluble in water and was also soluble in 0.4 percent aqueous solutions of sodium chloride. Aqueous salt solutions of greater saline concentration (such as about 10 percent concentrations), however, were found to precipitate the polymer. When minor proportions of the polymeric product were incorporated into polyacrylonitrile fibers in accordance with the disclosure of the copending application for United States Letters Patent of Wilhelm E. Walles and William F. Tousignant having Serial No. 696,352 which was concurrently filed November 14th, 1957 for "Acrylonitrile Polymer Compositions Having Enhanced Dye-Receptivity," the poly-N-vinyl-5-methyl-2-oxazolidinone was found to be an excellent dye-assisting adjuvant for the synthetic fibers.

EXAMPLE 5.—POLYMERIZATION OF N-VINYL-5-ETHYL-2-OXAZOLIDINONE

Poly-N-vinyl-5-ethyl-2-oxazolidinone was prepared in about the same manner as described in Example 3 with the exception that N-vinyl-5-methyl-2-oxazolidinone was substituted as the monomer in place of the N-vinyl-5-methyl-2-oxazolidinone. The polymer, which had solubility characteristics as described in the foregoing specification was a white colored powder. Several different polymeric products obtained in this matter were found to have Finkentscher K-values of 16.4; 23; and 48.

The poly-N-vinyl-5-ethyl-2-oxazolidinone was prepared into a formulation that was found to be an effective hair curling or setting spray, having the following composition, suitable for use with an aerosol dispenser.

| | Percent |
|---|---|
| PVO–E (K–16.4) | 2.5 |
| Dimethylphthalate | 0.5 |
| Denatured ethanol ("Formula 40") | 17 |
| Monofluorotrichloromethane ("Freeon 11") | 40 |
| Dichlorodifluoromethane ("Freon 12") | 40 |

The formulation, after being prepared, was placed in an aerosol bomb type of dispenser of the conventional variety. It was then employed to spray natural human air of a gray color. Two locks of hair were made up. Both were washed with water. One lock was set with a hair curler while wet; the other was sprayed for about 5–10 seconds at a distance of about 18 inches with the PVO–E-containing formulation, then set with a hair curler. After drying, the PVO–E-sprayed lock was found to be free of any tackiness. After two hours, the curlers were removed. Both locks of hair were observed to have formed into good tight curls. The PVO–E-treated curl, however, was springy and remained well-formed for considerable periods after the water-made curl had fallen out, which occurred within a period of time of about 4 hours.

Copolymers of either N-vinyl-5-methyl-2-oxazolidinone or N-vinyl-5-ethyl-2-oxazolidinone, or both, with such monomers as styrene, acrylonitrile, vinyl acetate, vinyl chloride, vinylidene chloride and the like are readily prepared by following conventional copolymerization techniques for preparation of the desired copolymeric product.

What is claimed is:

1. An alkyl ring substituted N-vinyl-2-oxazolidinone monomer of the structure:

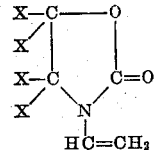

wherein each X is independently selected from the group consisting of hydrogen and alkyl radicals containing from 1 to about 4 carbon atoms with the limitation that at least one of said substituents must be an alkyl radical.

2. Monomeric N-vinyl-5-methyl-2-oxazolidinone.
3. Monomeric N-vinyl-5-ethyl-2-oxazolidinone.

References Cited in the file of this patent

UNITED STATES PATENTS 2,818,362   Drechsel _____ Dec. 31, 1957

OTHER REFERENCES

Furukawa et al.: Chem. Abstracts, vol. 48, col. 6428 (1954).